United States Patent [19]

Missout et al.

[11] Patent Number: 4,825,629

[45] Date of Patent: May 2, 1989

[54] DEVICE FOR INSERTING OPTICAL FIBERS INTO HELICAL GROOVES OF A RING IN A CABLING LINE

[75] Inventors: Bernard M. Missout; Jean-Pierre Michaux, both of Paris, France

[73] Assignees: Societe Anonyme de Telecommunications; Societe Industrielle de Liaisons Electriques, both of Paris, France

[21] Appl. No.: 159,123

[22] Filed: Feb. 23, 1988

[30] Foreign Application Priority Data

Mar. 2, 1987 [FR] France ................................ 87 02798

[51] Int. Cl.$^4$ .................... H01B 13/00; H01B 11/22; G02B 6/04
[52] U.S. Cl. ............................................. 57/6; 57/9; 57/13; 57/293; 57/352
[58] Field of Search ............... 57/6, 9, 19, 13, 14, 57/15, 352, 311, 314, 293, 294; 350/96.23

[56] References Cited

U.S. PATENT DOCUMENTS

| | | | |
|---|---|---|---|
| 4,309,864 | 1/1982 | Hulin | 57/6 |
| 4,483,134 | 11/1984 | McKay et al. | 57/9 X |
| 4,497,164 | 2/1985 | Dotti et al. | 57/13 X |
| 4,587,801 | 5/1986 | Missout et al. | 57/6 |
| 4,619,107 | 10/1986 | Missout et al. | 57/6 |
| 4,635,430 | 1/1987 | Missout et al. | 57/6 |
| 4,663,926 | 5/1987 | Girardon et al. | 57/9 X |
| 4,706,449 | 11/1987 | Akre | 57/9 X |
| 4,757,675 | 7/1988 | Oglesby et al. | 57/6 |

FOREIGN PATENT DOCUMENTS

| | | |
|---|---|---|
| 2388931 | 11/1978 | France . |
| 2418940 | 9/1979 | France . |
| 2500174 | 8/1982 | France . |
| 2022644 | 12/1979 | United Kingdom . |
| 2121209 | 12/1983 | United Kingdom . |

Primary Examiner—John Petrakes
Attorney, Agent, or Firm—Laubscher, Presta and Laubscher

[57] ABSTRACT

In an optical fiber cabling line where a grooved ring is axially drawn at a translational speed, there is provided a device designed to insert optical fibers in helical grooves of the ring. The fibers are unwound, are drawn through a rotating plate and converge following cone generating lines towards the device. In order to avoid the use of fiber-guides coupled directly in rotation with the ring, the device comprises a quill rotationally stationary and coaxial with the ring for laying the fibers into the grooves of the ring, and means, such as two worm screws set orthogonally to the ring, arranged after the quill in the travel direction of the ring and mechanically uncoupled from the ring for thrusting the fibers to the bottoms of the grooves. The worm screw also contributes to align the fibers as they leave the plate, with the ring grooves within the quill.

8 Claims, 3 Drawing Sheets

DEVICE FOR INSERTING OPTICAL FIBERS INTO HELICAL GROOVES OF A RING IN A CABLING LINE

BACKGROUND OF THE INVENTION

1. Field of the invention

The present invention relates to a device for inserting optical fibers into helical grooves of a ring travelling axially in a cabling line to obtain an optical fiber cable.

On the upstream side of the inserting device, the fibers are drawn from pay-out spools turning freely or braked, on a support plate which rotates around the strand and converge following cone generating lines towards the device. The rotational speed of the support plate is slaved at the apparent rotational speed of the grooves in the travelling ring, so that the fibers are correctly inserted in the grooves irrespective of pitch variation of the grooves as a result of manufacturing the ring by extrusion. On the downstream side of the device, the ring enters at least one taping unit to close the grooves containing the optical fibers by applying a protective sheath around the ring.

2. Description of the Prior Art

According to the prior art described in French patents Nos. 2,388,931, 2,418,940, 2,500,174, U.K. Pat. Nos. 2,022,644 and 2,121,209, and U.S. Pat. No. 4,635,430, an optical fiber inserting device comprises a fiber-guide support rotating coaxially to the ring and offering either ducts or grooves or capillary tubes or metal fiber-guides housed in conduits or grooves of the support, which converge along generating lines of a cone coaxial with the ring and act as fiber-guides to guide respectively the fibers drawn following the generating lines from the spools on the support plate towards the ring grooves.

As for the support plate, rotation of the fiber-guides support depends upon variations of the pitch of the ring grooves. Rotational coupling between the ring and the fiber-guide support is generally obtained either by pointed or bevelled downstream ends of the fiber-guides recessed in the ring grooves or by at least one locating and driving finger projecting from within a bore of the fiber-guide support and mating with a specific helical groove formed in the ring, or a groove intended to accommodate one optical fiber.

The use of such a fiber-guide support as described in U.S. Pat. No. 4,635,430 requires in practice some means for laying the optical fibers in the grooves since, as seen in cross-section to the ring, the downstream ends of the fiber-guides fill the ring grooves, and the fiber-guides insert the fibers exactly at the periphery of the ring, at a relatively large distance from the bottom of the grooves. The laying means consists of a rotation-stationary quill arranged on the downstream side of the fiber-guides support, in front of the downstream ends of the fiber-guides in the ring grooves, and traversed coaxially and freely by the ring.

The known inserting devices have many disadvantages:

the fiber-guide support and more particularly the fiber-guides, are complex members requiring careful manufacture to a high degree of precision and are in consequence expensive;

The fiber-guides which are thin and elongate by comparison with the exceedingly small diameter of the optical fibers which they guide, are firstly subject to obstruction by dirt and dust, and secondly are liable to bend or in some cases to break or crack, especially when the cabling line is started up and the ring is initially drawn manually, or when there are variations in the groove pitch and also in the groove section during operation of the line, as the result of the coupling between the ring and the fiber-guide support through the downstream ends of the fiber-guides;

although a fixed quill is occasionally installed to lay the fibers as they are inserted into the grooves, the fibers "float" in the ring grooves as they leave the inserting device so that some fibers tend to remain at the outer periphery of the ring and so become wedged or broken during the later ring raping, drawing and twisting operations.

OBJECTS OF THE INVENTION

The main object of this invention is to obviate the foregoing disadvantages.

Another object of this invention is to eliminate the use of fiber-guides and all direct coupling in rotation with the ring in an optical fiber inserting device.

A further object of this invention is to thrust the laid fibers to the bottom of the ring grooves.

SUMMARY OF THE INVENTION

Accordingly, a device for inserting optical fibers into helical grooves of a ring travelling axially, the optical fibers being drawn from support means rotating coaxially about the ring to converge following cone generating lines towards the device, comprises means rotationally stationary and coaxial with the ring for laying the converging fibers into the ring grooves, and means arranged after the laying means in the travel direction of the ring and uncoupled mechanically from the ring for thrusting the laid fibers to the bottoms of the grooves.

According to one feature of the invention, the laying means comprise a fixed quill having a smooth bore that incorporates a truncated cone section, preferably with convex generatrix, against which slide the converging fibers leaving the support means, and a cylindrical section extending the truncated cone section following the travel direction of the ring and substantially flush with the ring periphery. The truncated cone section progressively approaches the fibers to the periphery of the ring, and the cylindrical section depresses the approached fibers into the grooves, respectively. The bore of the quill is smooth and is thus simple to produce by comparison with the fiber-guide supports used in the prior art and is not liable to become clogged by dust.

According to another feature of the invention, the thrusting means includes at least one rotation member, completely uncoupled from the ring, and having a helical toothing which penetrates the ring grooves to thrust the laid fibers to the bottom of the grooves, and means for rotationally driving the rotating member as a function of the apparent rotational speed of the ring grooves. The rotating member may be either a worm screw or a toothed wheel rotating orthogonally or parallel to the ring, or a crown wheel having a bore with teeth which penetrate the grooves of the ring.

The thrusting means also permit, within the fixed quill, to correct alignment of the ring grooves, forming radial slots as seen in cross-section, with generating lines of the truncated cone along which the optical fibers travel and converge from the support means.

BRIEF DESCRIPTION OF THE DRAWING

The foregoing and other objects, features and advantages of the invention will be apparent from the following detailed description of several preferred embodiments of the invention with reference to the corresponding accompanying drawings in which.

DESCRIPTION OF THE PREFERRED EMBODIMENTS

Figure 2:
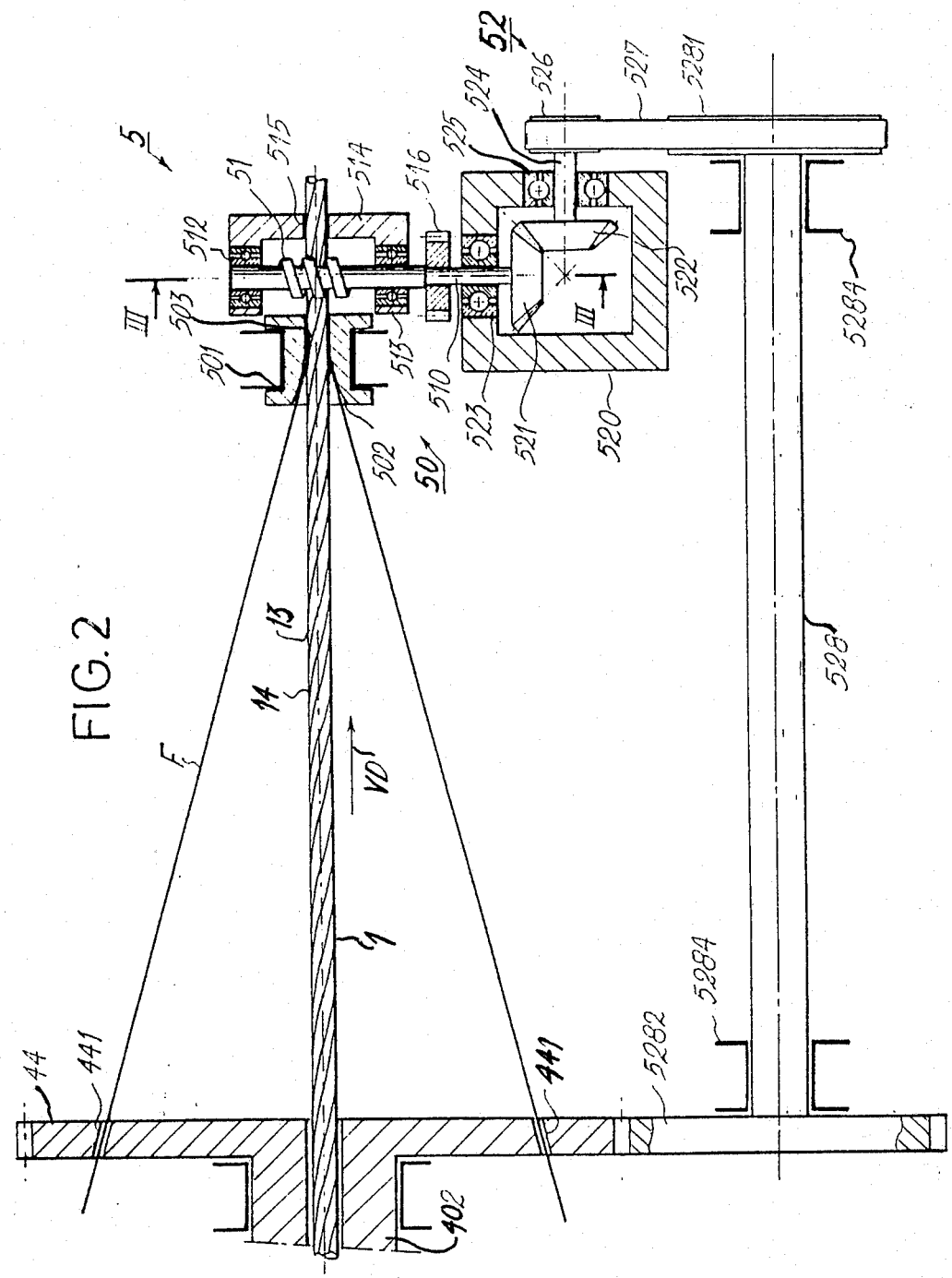
FIG. 2 is a detailed view, partially in longitudinal cross-section, of the inserting device.
Figure 3:
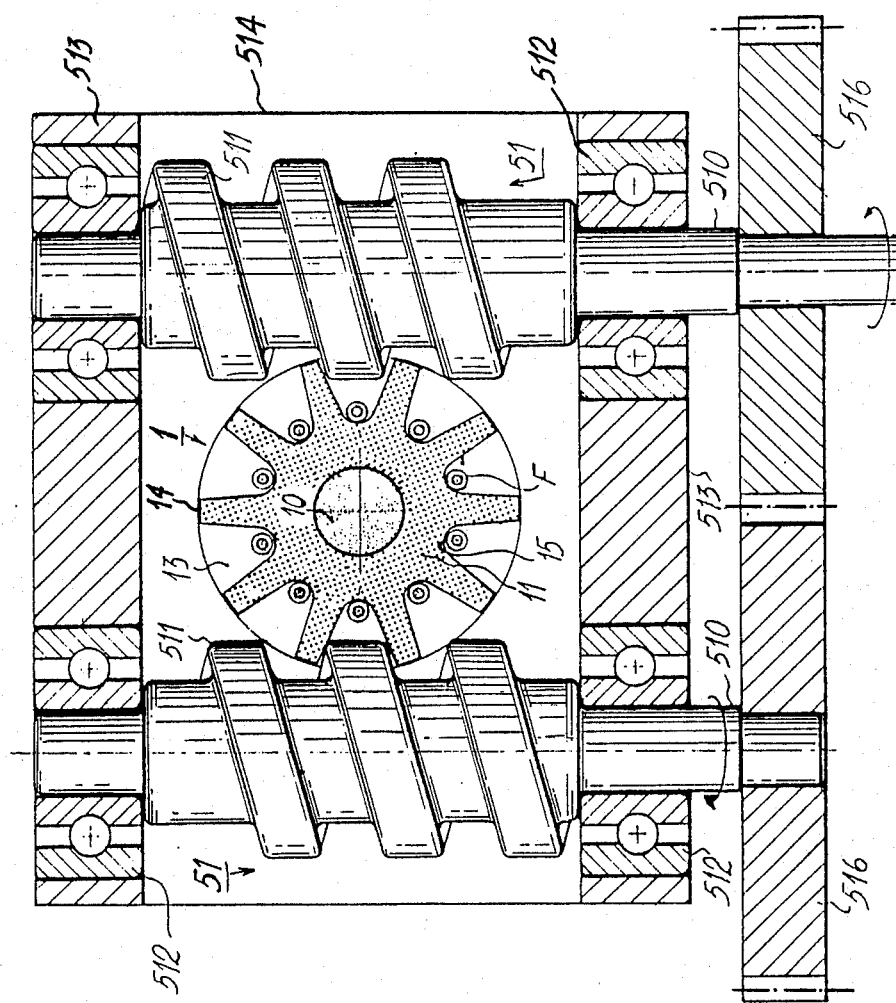
FIG. 3 is a cross-section view taken along line III—III of FIG. 2 showing two worm screws for thrusting the optical fibers.

As shown i the longitudinal view and cross-section in FIGS. 2 and 3, a ring 1 to constitute a known optical cable core comprises, in the illustrated embodiment, a central cylindrical strengthening reinforcement 10 and a normally cylindrical section 11 obtained by continuous plastic extrusion around the carrier. The central reinforcement 10 consists of one steel wire or several twisted steel wires; in another embodiment, the ring contains no reinforcement and/or contains threadlike reinforcements imbedded in the section 11. The section comprises $N=10$ parallel spiral grooves 13 equally spaced over the periphery of the ring and designed to accommodate one optical fiber F each, according to the illustrated embodiment, or several optical fibers. As shown in FIG. 3, the grooves 13 seen in cross-section are analogous to radial slots and form between them teeth or branches of a regular star which constitute trapezoidal ribs 14 parallelly and helically extending in a longitudinal direction as shown at FIG. 2.

In the embodiment illustrated, the grooves 13 have a V-shaped cross-section with a semi-circular bottom 15 and an apex angle of approximately 30° to 60° although this cross-section may be semi-circular, trapezoidal, rectangular or square, for example. The grooves follow helical paths which may be sometimes direct sometimes retrograde. The grooves have a pitch P large with respect to the outer diameter of the ring, typically in a ratio of the order of 10 to 60.

Figure 1:
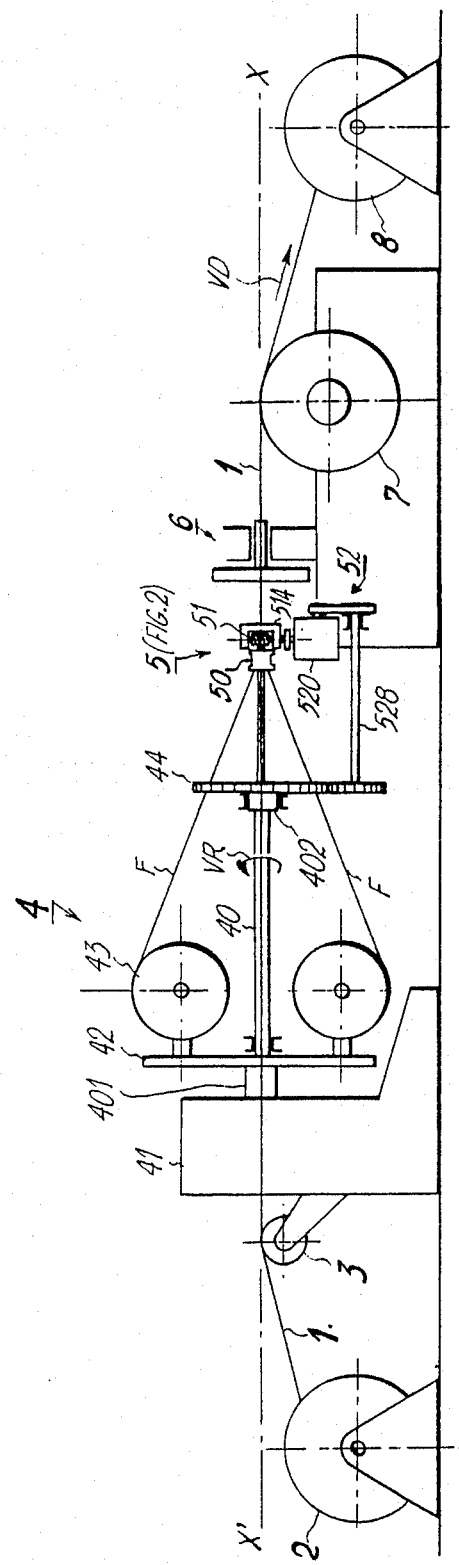
FIG. 1 is a schematic longitudinal view of an optical fiber cabling line including an optical fiber inserting device according to the invention.

Referring to FIG. 1, it is recalled, as an example, that an optical fiber cabling line comprises mainly, from an upstream end to a downstream end in the mainly horizontal direction X'X of the ring 1 for the illustrated embodiment:

(a) a pay-out stand 2 from which the ring 1 is unwound; in the illustrated embodiment, pay-out stand 2 is a horizontally mounted freely rotating spool or a storage drum with vertical axis;

(b) an assembly 3 of braking and tensioning wheels, one only being illustrated, to draw linearly the ring and to subject the ring to a tensile stress as far as the downstream end of the cabling line;

(c) an optical fiber feeding device 4 comprising (c1) a rotating longitudinal tube 40 crossed coaxially and freely by the travelling ring 1, having upstream and downstream ends 401 and 402, the upstream end 401 of the tube being supported by ball-bearing journals housed in a fixed frame on the cabling line and cooperating with an electromechanical slaving system 41 with corrector motor for slaving the rotational speed VR of the tube around the ring to the constant rectilinear travel speed VD of the ring, and more precisely, to the apparent rotational speed of the grooves equal to the number VD/P of the pitches of the helical grooves 13 on the ring per second, thereby correcting helical groove pitch variations due to the ring manufacturing by extrusion, (c2) a large vertical support plate 42 secured to the upstream end 401 of the tube and supporting $N=10$ optical fiber pay-out spools 43 freely rotably or braked and mounted horizontally, and equally spaced around axis X'X, and (c3) a small vertical plate 44 secured to the downstream end 42 of the tube and supported by a ball-bearing journal; in the plate 44 being foreseen $N=10$ apertures 441 (FIG. 2) circularly equispaced, through which the optical fibers F are guided and drawn from the pay-out spools 43, permanently, along the generating line of a cone that converges towards axis X'X on the downstream side of plate 44;

(d) an inserting device 5 for inserting the fibers F outgoing from the feeding device 4 into the grooves 13 of the travelling ring 1;

(e) a lapping and/or taping device 6 for lapping and/or taping the ring containing the optical fibers with one or more protective sheaths, e.g., in terphane, the device 6 being coupled to a main motor to translate the ring at the advancing speed VD, and the main motor being coupled to the corrector motor included in the slaving system by means of a differential rotationally driving the plates 42 and 44;

(f) a drawing device 7 comprising a drawing wheel having a transversal horizontal axle driven by the main motor and around which the tapped ring is wound several times, to exert a pull on the ring from the assembly of upstream wheels 3, during the insertion of the fibers into the grooves of the ring, and thus providing an excess length of the fibers in relation to the grooves when the tapped ring leaves the line and reverts to its unstressed initial condition, ready for use; and (g) a winding device 8 comprising a storage wheel having a horizontal transverse axle driven by the main motor, and around which the tapped ring containing the optical fibers is wound and stored, ready for use.

For further information regarding this type of known cabling line, reference can be made in particular to U.S. Pat. No. 4,587,801.

As shown in detail in FIGS. 2 and 3, an inserting device 5 embodying the invention comprises basically a smooth fixed quill 50, two worm screws 51, and a mechanical transmission system 52 for rotationally aperture plate 44 and thus, as a function of the variable pitch P of the grooves 13 of ring 1.

The quill 50 has a generally cylindrical shape and is fixed coaxial with the ring 1 on a bracket 501 which forms a journal for the frame. Within the quill are formed along axis X'X a smooth truncated cone shaped bore 502 on the upstream side opposite plate 44, and a smooth cylindrical bore 503 on the downstream side, bore 503 having a diameter slightly greater than the external diameter of the ring 1 and equal to the diameter of the small base of the truncated cone bore 502 so that bore 503 is substantially flush with the ring ribs 14. The truncated bore 502 is tangential to the above-mentioned cone, having an apex angle of the order of 30°, along the generating lines of which are guided and drawn the optical fibers F from the pay-out spools 43 and through the apertures 441 of plate 44. Preferably, in order to facilitate the introduction of fibers F into the quill following curved trajectories, without interruption, the longitudinal profile of the truncated bore 502 offers a slightly-convex revolution surface having a wide curve radius. The fibers F thus slide through the truncated cone bore 502, progressively approach the periphery of the travelling ring 1 and are simultaneously laid into the respective grooves 13 of the ring by the cylindrical bore 503 through which the ring 1 runs freely. The fibers F are then thrusts to the bottom 15 of grooves 13 by means of worm screws 51 which also align grooves 13 of the ring, seen in cross-section, with the generating lines of the converging fiber cone at the level of the quill 50 and substantially at the junction between bores 502 and 503.

The worm screws 51 have parallel shafts 510 mounted symmetrically and perpendicularly with respect to the axis X'X of ring 1 as it exits from the cylindrical bore 503 of the fixed quill 50. Each screw 511 offers a helical threading that laterally and slidably meshes with the ribs forming the teeth 14 of ring 1. Each worm screw 51 and the ring 1 which is analogous to a helical toothed wheel when seen in cross-section, thus form a helical gearing with orthogonal axes; but according to the invention the apparent rotation of the grooves 13 in ring 1 does not affect rotation of the worm screw since the ring and worm screw 51 are completely uncoupled. The helical threadings of screws 51 have the same direction as the ring helical grooves 13 which are all right-hand helices in the illustrated embodiment. The two screws 51 rotate in opposite directions.

As shown in detail in FIG. 3, each worm screw 51 has only one helical thread 511 the width of which at its outer periphery is less than the width of the grooves 13 measured at the periphery of ring 1 so that the thread penetrates to at least half the depth of grooves 13 and thus thrusts the optical fibers F towards the bottoms 15 of the grooves as the ring travels forward and, simultaneously, the worm screws rotate by means of transmission system 52. This thrust of the fibers complements the automatic pushing of the fibers to the bottom of the grooves 13 imparted by the helical character of these grooves.

In other embodiments, each worm screw incorporates several threads, for example four.

For a worm screw with one thread, the rotational speed of the screws is equal to N×(VD/P), where VD/P is the apparent rotational speed of the ring grooves. Thus for a translation movement of one pitch P of the ring, each of the screws 51 thrusts successively the N=10 fibers F to the bottoms 15 of the respective grooves 13. The uses of a single worm screw has proved adequate in practice for most grooved rings; however, and notably when the ring grooves 13 are wide and several optical fibers F are to be inserted into each ring groove 13 the use of two worm screws contributes to direct the fibers more effectively into the bottoms of the grooves and to align the ring grooves with the generating lines of the truncated cone along which the fibers converge. According to other embodiments, two pairs of worm screws or more may be provided along the ring, on the downstream side of quill 51.

With again reference to FIG. 2, each of the worm screws 51 is rotably mounted orthogonally with respect to ring 1 and vertically by means of two ball bearings 512 housed in two longitudinal branches 513 of a console 514 with U-shaped longitudinal section. The console is fixed to the cabling line frame. The ring 1 travels freely in a cylindrical bore 515 formed in a vertical core of console 514 located near the worm screws 51 to constitute a second fixed quill guiding ring 1.

Two gear wheels 516 are lodged under console 514 in a horizontal Plane and fixed to the shafts 510 of the worm screws and mesh with one another to rotate worm screws 51 in opposite directions. One of the wheels 516 is driven by the driving other, which is in turn rotatably driven by the mechanical transmission system 52.

System 52 comprises a square longitudinal section support 520 fixed to the frame and a bevel and converging gearing having a horizontal wheel 521 and a vertical wheel 522. Wheel 521 is fixed to the lower end of the worm gear shaft 510 which supports the driving wheel 516 and is vertically guided through a ball-bearing 523 housed in support 520. The vertical wheel 522 is fixed to an end of a driven horizontal shaft 524 supported by a ball bearing 525 housed in support 520. Another end of the shaft 524 is linked to a driven pulley 526 cooperating via a belt drive 527 with a driving pulley 5281 fixed to a downstream end of a horizontal transmission shaft 528. An upstream end of shaft 528 is fitted with a gear wheel 5282 which meshes with the toothed periphery of plate 44 forming a toothed crown. The downstream and upstream ends of shaft 528 are supported by adequate journals 5283 and 5284 secured to the frame of the cabling line.

As it is known that plate 44 rotates at a rotational speed slaved at the apparent rotational speed of grooves 13 in ring 1, the worm gears 51 then rotate with rotational speeds varying in terms of pitch P of the grooves as controlled through members 5282, 528, 5281, 526, 522 and 521, but the travelling ring 1 has no direct effect on the rotation of the worm gears 51.

In another embodiment, a worm gear 51 is replaced by a toothed wheel or worm gear having a helical toothing substantially complementary to the ring grooves 13 and a longitudinal axis parallel to the ring and rotating in the opposite direction to the apparent rotation of the ring grooves.

According to yet another embodiment, the two worm gears 51 are replaced by a toothed crown wheel having a bore coaxial with ring 1 and fitted with an inner helical toothing substantially complementary to grooves 13 to mesh with the grooves 13 in ring 1, and having an external peripheral toothing to mesh directly or through a notched belt with a sprocket fixed to the downstream end of the transmission shaft 528, instead of the pulley 5281; in this case, the bore of the toothed crown wheel has as many teeth as there are grooves 13 so that each of the teeth penetrates into one respective groove 13 and each of the N optical fibers so laid by the quill 50 is permanently pushed down by the respective tooth to the bottom of the correspondant groove in the ring. The crown wheel has a rotational speed equal to the apparent rotational speed of the ring grooves.

What we claim is:

1. Apparatus for inserting optical fibers into helical grooves of an elongated cable core ring as the ring is transported along an axis in order to form an optical fiber cable, comprising
   (a) optical fiber supply means for supplying at least one optical fiber to the core ring, said supply means being spaced from the ring axis and being rotatably driven thereabout, whereby the fibers converge toward the ring;
   (b) stationary fiber layering means coaxially arranged relative to the core ring downstream of said supply means for receiving the converging fibers and for laying the fibers into the ring grooves, respectively; and (c) thrust means arranged downstream of said laying means for thrusting the laid fibers to the bottoms of the ring grooves, respectively.

2. Apparatus as defined in claim 1, wherein said laying means comprises a fixed quill containing a throughbore which progressively inserted the converging fibers into the grooves of the ring as the ring passes coaxially therethrough.

3. Apparatus as defined in claim 2, wherein said bore comprises first and second portions, said bore first portion having the configuration of a truncated cone the surface of which is smooth for slidingly directing the fibers toward the ring grooves, respectively, said bore second portion having a cylindrical configuration the diameter of which corresponds with the diameter of the ring and the surface of which is smooth to retain the fibers in the respective ring grooves.

4. Apparatus as defined in claim 3, wherein said bore first portion has a convex truncated cone configuration.

5. Apparatus as defined in claim 1, wherein said thrust means comprises (1) at least one rotating member having a helically toothed surface, said teeth penetrating into the ring grooves to thrust the fibers to the bottom of the grooves, respectively; and (2) means for rotating said rotating member in accordance with the rotational speed of the helical ring grooves as the ring is axial transported.

6. Apparatus as defined in claim 5, wherein said rotating member comprises a worm screw including a rotating shaft orthogonally mounted relative to the ring.

7. Apparatus as defined in claim 6, wherein said thrust means comprises two rotating members including rotating shafts symmetrically positioned with respect to the ring.

8. Apparatus as defined in claim 5, wherein said rotating means is coupled with said rotating supply means.

* * * * *